United States Patent [19]

Stier

[11] 4,438,423

[45] Mar. 20, 1984

[54] DEVICE FOR PRODUCING AN OPTICAL OR ACOUSTIC SHIFT INSTRUCTION

[75] Inventor: Bernhard Stier, Kelkheim-Fischbach, Fed. Rep. of Germany

[73] Assignee: VDO Adolf Schindling AG, Frankfurt am Main, Fed. Rep. of Germany

[21] Appl. No.: 350,973

[22] Filed: Feb. 22, 1982

[30] Foreign Application Priority Data

Mar. 9, 1981 [DE] Fed. Rep. of Germany ....... 3108920

[51] Int. Cl.³ ...................... B60Q 1/26; B60K 23/00
[52] U.S. Cl. ................................ 340/52 R; 340/52 D; 340/62; 340/669; 307/10 AT; 434/71; 74/856; 74/861; 74/DIG. 7; 200/61.88; 200/61.91
[58] Field of Search ................. 340/52 R, 52 D, 52 F, 340/669, 60, 62; 307/10 R, 116, 10 AT; 74/844, 856, 861, DIG. 7, 862; 434/66, 71; 200/61.88, 61.9, 61.91; 116/28.1

[56] References Cited

U.S. PATENT DOCUMENTS

| 4,037,196 | 7/1977 | Atkinson et al. | 200/61.88 |
| 4,174,766 | 11/1979 | Kalogerson | 340/52 D |
| 4,199,747 | 4/1980 | Miller et al. | 200/61.88 |
| 4,355,296 | 10/1982 | Drone | 340/52 R |

FOREIGN PATENT DOCUMENTS

2926070 1/1981 Fed. Rep. of Germany.

*Primary Examiner*—Donnie L. Crosland
*Attorney, Agent, or Firm*—Martin A. Farber

[57] ABSTRACT

A device for producing a shift instruction has three threshold switches (6, 7, 12) which are dependent on the rpm (speed of rotation). The first threshold shift (6) is connected via an AND gate (5) to an upshift signal indicator (9). This AND gate is conductive only when the gas pedal (1) is depressed less than 20% and the speed threshold of the first threshold transmitter (6) is reached. If the gas pedal (1) is depressed further, the upshift signal indicator (9) only lights up when the speed threshold of the third threshold switch, namely the maximum permissible speed of rotation is reached. The downshift signal indicator (11) lights up when the speed of rotation of the engine drops below the threshold of the second threshold switch (7). By this development shift instructions are given which sufficiently take into account the engine power of the vehicle without the necessity of measuring this engine power.

7 Claims, 1 Drawing Figure

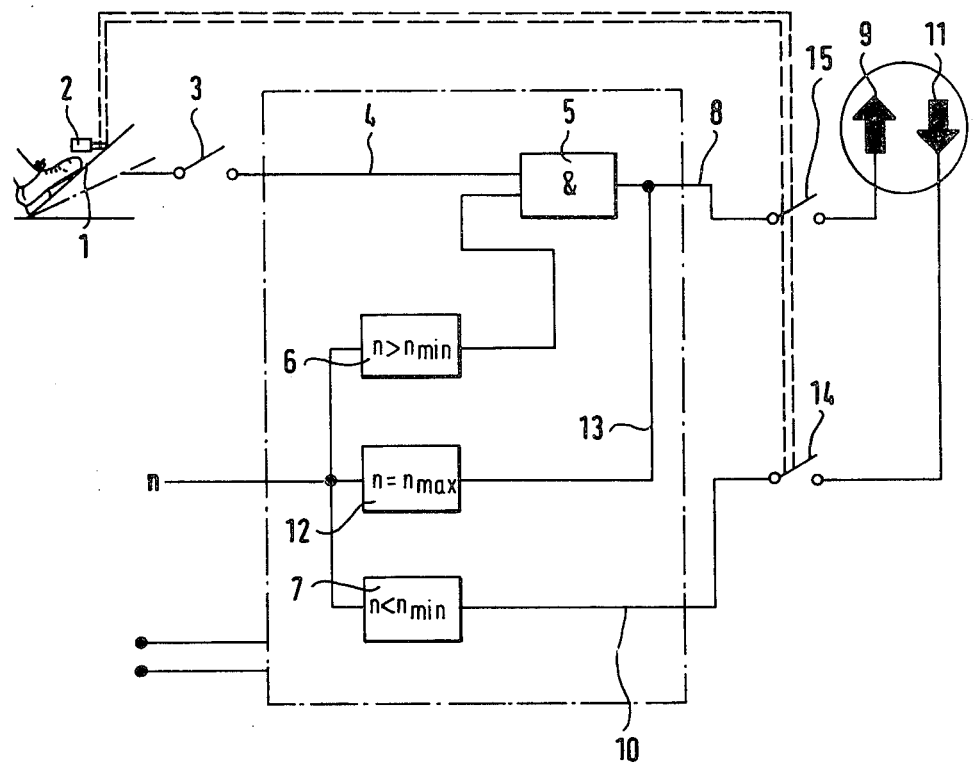

DEVICE FOR PRODUCING AN OPTICAL OR ACOUSTIC SHIFT INSTRUCTION

BACKGROUND OF THE INVENTION

1. Field of the Invention

The present invention relates to a device for producing an optical or acoustic shift instruction in which a speed-of-rotation signal is fed to a first threshold switch for connecting an upshift signal indicator and to a second threshold switch for connecting a downshift signal indicator. Such a device forms the subject matter of Federal Republic of Germany OS No. 29 26 070.

2. Description of the Prior Art

In the known device, a speed-dependent and an engine-load-dependent switch lie in the control circuit of a signal indicator. The engine-load-dependent switch for the upshift signal is opened upon high engine power but closed upon low engine power. This has the result that above a speed of rotation registered by the threshold switch the "upshift" signal appears, provided that the switch which is dependent on the engine load is not opened since the engine power is high at the time and upshifting would be inadvisable inasmuch as the car, for instance, is moving at the time up a hill.

The previously known device for the producing of shift instructions takes into account the physical circumstances of an automotive vehicle which apply for the selection of the time for shifting and represents a signal logic operation. It has the disadvantage, to be sure, that two switches operating as a function of the engine load must be provided. While the speed of rotation of the engine can be readily measured, the production of signals which represent the instantaneous power of the engine affords considerable difficulties. In a carburetor engine one can, to be sure, frequently conclude with a certain amount of accuracy what the engine power is, based on the intake pressure of the carburetor, but a determination of the power in the case of a diesel engine at reasonable expense is out of the question.

OBJECTIVE OF THE INVENTION

The object of the present invention is, therefore, to provide a device of the aforementioned type which, without measuring the engine output, gives with sufficient accuracy shift instructions by which it is possible to drive a vehicle provided with a device of the invention in a manner which is favorable with respect to its consumption and produces as little wear as possible.

SUMMARY OF THE INVENTION AND ADVANTAGES

This object is obtained by the invention in the manner that, behind the first threshold switch (6), there is arranged an AND gate (5) which is connected on its input side furthermore with a gas-pedal position switch (3) so that when the gas pedal (1) is depressed only slightly it is connected to the upshift signal indicator (9), and that in addition a third threshold switch (12) is provided, in parallel to the two other threshold switches (6, 7), it being connected directly with the upshift signal indicator (9) and becoming conductive when the maximum permissible speed of rotation is reached.

The advantages of the invention reside primarily in the simple construction of the device. Although switches which are dependent on the engine load are dispensed with, the device of the invention gives shift instructions which take the physical requirements of an internal combustion engine into substantial consideration. Due to the fact that the position of the gas pedal is also taken into account for the production of shift instructions, the device is capable, for instance when a given speed of rotation is exceeded, of distinguished whether, for instance, the full engine power is necessary and therefore it is not advisable to upshift or whether, for instance, upshifting is to be effected upon moving up a gentle incline. Coasting is also properly handled with the device in accordance with the invention. Coasting is characterized by increasing speed of rotation without the gas pedal being actuated. If this speed increases to above the value of the first threshold switch then the upshift signal appears without the gas pedal being depressed. On the other hand, if one sharply accelerates with a large amount of gas, the upshift signal then, properly, does not occur at the time that the speed threshold of the first threshold switch is exceeded but only when the third threshold switch is connected and thus the maximum permissible speed of rotation is reached.

The advantage of the device of the invention that no switches which are dependent on engine load need be provided naturally is particularly beneficial for automotive vehicles with diesel engine since the determination of the engine power is very difficult in the case of such vehicles.

It is advantageous if, in accordance with one embodiment of the invention, the AND gate (5) blocks when the gas pedal (1) is depressed 20%. This operating point has been determined as optimal position of the device of the invention in the case of diesel engines.

By the fact that a switch which opens upon shifting to the highest gear is provided in front of the upshift signal indicator (9) and that a switch which opens upon engagement of first gear is provided in front of the downshift signal indicator (11) the result is obtained that no upshift signal can be produced when the car is already in the highest gear and that no downshift signal can occur when one is already traveling in first gear.

The appearance of an undesired downshift signal when traveling in first gear can be avoided in a different manner namely that the second threshold switch (7) is connected for the turning on of a downshift signal indicator (11) only upon a dropping below the speed threshold.

The fact that a limit switch (2) which responds in idle position is provided on the gas pedal and is connected with two break switches (14,15) which are arranged in front of the upshift and downshift signal indicators (9,11) and open in the idling position of the gas pedal (1) serves for easier recognition of coasting and prevents an upshift signal appearing when already traveling in the highest gear.

If, in accordance with another advantageous embodiment of the invention, the third threshold switch (12) is set at a speed of rotation which is slightly above the maximum permissible speed of travel in the highest gear, then no upshift signal can occur in the highest gear as long as the user of a car provided with the device of the invention does not exceed the permissible maximum speed. If he exceeds this speed to such an extent that the third threshold switch responds, then the instruction "upshift", which cannot be carried out, appears. By this signal the attention of the driver is directed to the fact that he has exceeded the maximum speed.

Another favorable embodiment of the invention resides in the fact that the first and second threshold switches (6, 7) are adjustable as a function of the load of the vehicle. By such an adjustment of the threshold values, the result can be obtained that the individual gears of the car can be traveled in longer before a shift instruction appears, whereby the physical circumstances are duly taken into account.

The invention permits various possible embodiments.

BRIEF DESCRIPTION OF THE DRAWING

With the above and other objects and advantages in view, the present invention will become more clearly understood in connection with the drawing, in which the only FIGURE is a diagrammatical showing of one preferred embodiment of a circuit.

DETAILED DESCRIPTION OF THE PREFERRED EMBODIMENT

Referring to the drawing, 1 is the gas pedal of an automotive vehicle. This gas pedal is in idling position and is in contact with a limit switch 2. Furthermore, a gas-pedal position switch 3 is shown within the gas pedal 1. It is to be closed as long as the gas pedal is not depressed more than 20%.

From the gas-pedal position switch 3 a line 4 leads to an AND gate 5. This AND gate 5 is furthermore connected on its input side with a first threshold switch 6. A second threshold switch 7 is connected in parallel to the first threshold switch 6. A signal n which is dependent on the speed of rotation of the engine of the vehicle is fed to the input side of the threshold switches 6 and 7.

A line 8 leads from the AND gate 5 to an upshift signal indicator 9. This indicator can be an upward-pointing arrow which lights up when the instruction "upshift" is to be given. A line 10 leads from the second threshold switch 7 to a downshift signal indicator 11, which may, for instance, be a downwardly directed arrow.

In parallel to the two threshold switches 6 and 7 there is connected a third threshold switch 12 which is connected via a line 13 with the output of the AND gate 5. A break switch 14, 15 is arranged in each of the lines 8 and 10. These break switches 14, 15 pass into the open position when the gas pedal is in the idling position and the limit switch 2 is thereby activated.

In order to explain the manner of operation of the device of the invention let us assume that the first threshold switch 6 responds, for instance, at 1200 rpm and the second threshold switch 7 at 1100 rpm. The third threshold switch is to respond at the maximum permissible speed of rotation of the engine of, for instance, 1800 rpm. If the vehicle is gently accelerated by depressing the gas pedal less than 20%, then the gas-pedal position switch 3 is closed. As soon as the speed of rotation has increased to above 1200 rpm, the AND gate becomes conductive so that thereupon the upshift signal indicator 9 lights up, thus giving the instruction to upshift. If upshifting is effected, the speed of rotation drops initially again to less than 1200 rpm so that the signal goes out and it reappears as soon as the speed of rotation again exceeds the threshold value of 1200 rpm as a result of further acceleration.

If very strong acceleration is effected by depressing the gas pedal to the floor then the gas pedal position switch 3 opens so that the AND gate cannot become conductive when the threshold of the first threshold switch 6 is exceeded. The upshift signal therefore appears only when the speed of rotation is so high that the third threshold switch 12 is connected at the maximum permissible speed.

If, for instance, when traveling on an incline, the speed of rotation drops below 1100 rpm, the second threshold switch 7 will respond, causing the downshift signal indicator to be activated.

In order to prevent an upshift signal being given when the car is coasting in fourth gear, the break switch 15 is provided which is always opened when the gas pedal is in the idling position. Similarly, the break switch 14 is always open in the idling position of the gas pedal 1 so that no downshift signal appears when traveling in first gear should the speed of the engine drop below 1100 rpm.

Various circuit measures by which shift instructions which cannot be carried out since one is already, for instance, in the highest or lowest gear have not been shown in the drawing.

I claim:

1. In a device for producing an optical or acoustic shift instruction in which a speed-of-rotation signal is fed to a first threshold switch for connecting an upshift signal indicator and to a second threshold switch for connecting a downshift signal indicator, the device being adapted to cooperate with a gas pedal of a vehicle, the improvement comprising
   an AND gate arranged behind the first threshold switch,
   a gas-pedal position switch being connected to said AND gate at an input side of the latter such that when the gas pedal is depressed only slightly it is connected to the upshift signal indicator, and
   means comprising a third threshold switch in parallel to the two other said threshold switches, being connected directly with said upshift signal indicator and for becoming conductive when the maximum permissible speed of rotation is reached.

2. The device according to claim 1, wherein said gas pedal position switch blocks said AND gate when the gas pedal is depressed 20%.

3. The device according to claim 1, further comprising
   a first switch means for opening upon shifting to the highest gear is provided in front of the upshift signal indicator, and
   a second switch means for opening upon engagement of first gear is provided in front of the downshift signal indicator.

4. The device according to claim 1, wherein said second threshold switch is connected for turning on of the downshift signal indicator only upon a dropping below the speed threshold.

5. The device according to claim 1, further comprising
   two break switches are arranged in front of the upshift and downshift signal indicators and open in the idling position of the gas pedal, and
   a limit switch, which responds in idle position, is provided at the gas pedal and is connected with said two break switches.

6. The device according to claim 1, wherein the third threshold switch is set at a speed of rotation which is slightly above the maximum permissible speed of travel in the highest gear.

7. The device according to claim 1, wherein the first and second threshold switches are adjustable as a function of the load of the vehicle.

* * * * *